United States Patent [19]

Vivio

[11] Patent Number: 5,706,447
[45] Date of Patent: Jan. 6, 1998

[54] SYSTEM FOR AUTOMATIC RECONFIGURATION TERMINATION TO MULTI-PROCESSOR BUS WITHOUT ADDED EXPENSE OF REMOVABLE TERMINATION MODULE

[75] Inventor: Joseph Vivio, Austin, Tex.

[73] Assignee: Dell USA, L.P., Round Rock, Tex.

[21] Appl. No.: 514,285

[22] Filed: Aug. 11, 1995

[51] Int. Cl.$^6$ .................................................. G06F 13/40
[52] U.S. Cl. ........................................ 395/309; 395/311
[58] Field of Search ................................. 395/309, 311

[56] References Cited

U.S. PATENT DOCUMENTS

| | | | |
|---|---|---|---|
| 5,426,739 | 6/1995 | Lin et al. | 395/325 |
| 5,454,081 | 9/1995 | Thome | 395/281 |
| 5,467,453 | 11/1995 | Kocis . | |
| 5,550,990 | 8/1996 | Keener et al. | 395/309 |
| 5,553,250 | 9/1996 | Miyagawa et al. | 395/309 |

*Primary Examiner*—Krisna Lim
*Attorney, Agent, or Firm*—Henry N. Garrana; Mark P. Kahler; Diana L. Roberts

[57] ABSTRACT

A modular computer bus providing a system for automatically maintaining proper bus termination. A module connector is located at on end of the bus. A switch device is located at the end of the bus as close as possible to the connector. The switch device couples a termination device to the end of the bus when the switch device is in an on state. The switch device is in the on state when no module is present in the connector and in an off state when a module, such as a processor module, is present in the connector. When the switch device is in the off state, the termination device is not coupled to the bus. Instead the end of the bus is terminated by a termination device on the module. Thus, computer bus is correctly terminated automatically when a module is inserted into or removed from the connector. Thus a bus structure is provided for implementing a bus standard while providing modularity and automatically maintaining proper bus termination. The superior flexibility, upgradeability and serviceability benefits of a modular bus system are achieved without incurring the increased damage risk, cost, and user confusion disadvantages of prior termination techniques.

28 Claims, 4 Drawing Sheets

SYSTEM FOR AUTOMATIC RECONFIGURATION TERMINATION TO MULTI-PROCESSOR BUS WITHOUT ADDED EXPENSE OF REMOVABLE TERMINATION MODULE

FIELD OF THE INVENTION

The present invention relates to bus architectures in computer systems, and more particularly to a modular computer bus architecture having strict requirements for termination.

DESCRIPTION OF THE RELATED ART

Modern computer systems generally include various system components connected together using one or more interconnected buses. For example, a modern computer system typically includes a microprocessor or central processing unit (CPU) coupled through a processor bus to a cache/local bus bridge to system memory. The cache/local bus bridge is in turn coupled to an input/output (I/O) bus, such as the peripheral component interconnect (PCI) bus. An additional expansion bus, such as the industry standard architecture (ISA) or AT bus or the Extended ISA (EISA) bus may be coupled to the PCI bus.

A computer bus essentially comprises the electrical signal paths or lines that connect two or more devices. In general, a computer bus is based on an industry standard, where only those devices which conform to the industry standard can be connected to the bus. In order to increase computer system speed and performance, new bus designs are often introduced which provide increased bandwidth and increased performance over prior bus designs.

As system speed and performance increases, the bus signal edge rate and frequency at which the bus signals switch increases. At high frequencies, such as greater than 33 MHz, or fast edge rates, such as less than 2 ns, signal integrity on the bus becomes a problem. The integrity problems are exacerbated as more devices, or loads, are added to the bus and the bus length increases. Signal integrity problems such as ringing and reflections can cause bus devices to "see" false signal edges or incorrect voltage levels on the bus. These integrity problems are worsened in multiprocessor systems because each processor adds another load and more length to the bus.

In order to solve the above signal integrity problems, new bus designs often specify limits on the electrical and mechanical characteristics of the bus, such as trace length, number of loads, and required termination. Bus termination is often required to improve signal integrity and prevent signal reflections. However, bus termination must be performed at the correct points on the bus, such as the ends of the bus, in order to be effective. This requirement can limit the systems designer's flexibility regarding the location of bus devices and options to expand the bus. Some prior designs have attempted to increase bus flexibility by having connectors located on the bus which receive different bus device modules. However, as modules are added to the bus in this manner, the end points of the bus change, and thus the bus termination is no longer located at the correct point.

One example of a new proposed bus standard facing the aforementioned problems is the Intel P6.0 bus, which is designed to be a high performance, high speed multiprocessor interconnect bus for personal computer systems. The P6.0 bus is primarily intended for the P6 processor, which is the successor to Intel's P5 or "Pentium" processor. The Intel P6.0 bus standard is based on a signal protocol as well as electrical and mechanical specifications. In order to assure maximum performance, Intel has promulgated several guidelines which are provided to help system designers meet the very tight electrical and mechanical design constraints for the P6.0 bus standard, including strict bus termination requirements. Intel has also proposed a bus implementation that meets the P6.0 bus standards. However, Intel's proposed bus implementation limits the possible options and design flexibility.

The Intel P6.0 bus architecture includes split transactions, high bandwidth, and uses GTL+(Gunning Transistor Logic) I/O (input/output) buffer technology. In order to achieve the desired high performance and to assure signal integrity, Intel has imposed strict electrical and mechanical constraints or guidelines for a computer system including a P6.0 bus. These guidelines include, but are not limited to, limitations on bus trace length, trace topology, and device positioning. In particular, the P6.0 bus standard specifies a maximum of eight P6.0 bus loads. Also, P6.0 microprocessors must reside on the electrical ends of the bus, and trace "stubs" are not allowed on the P6.0 bus. Furthermore, the P6.0 bus is required to be electrically terminated at both ends, and P6.0 devices are required to be evenly spaced along the P6.0 bus. These are only a few of the specified guidelines.

Although the tight design constraints for the P6.0 bus are thought to be necessary to achieve maximum performance, Intel's proposed implementation substantially limits flexibility and does not allow for all product requirements.

First, the proposed implementation will be very large and expensive to build. The P6 microprocessor alone requires several square inches of board space, and the system logic required to support the P6.0 bus and maintain high performance, such as the memory controller, I/O bridge, etc., also requires a large area of board space. A single PCB incorporating these components would be very large. Also, the single PCB configuration would have to contain multiple complex parts, increasing the probability of manufacturing defects and also increasing the resources required to build the PCB. Further, a large PCB must be implemented with controlled impedance which also adds to the cost. To maintain signal integrity, the width and height of the individual traces along the board must be maintained within certain tight tolerances, which becomes increasingly difficult as the size of the PCB increases.

Second, the proposed implementation significantly limits product and design flexibility and substantially reduces upgradeability by reducing configuration options. Each different configuration would have to be customized resulting in multiple versions of the PCB. If upgrades are desired or contemplated, additional support circuitry and corresponding sockets must be included on the PCB, thereby increasing its size and cost. Also, adding bus devices in upgrade sockets may change the effective bus end points and thus result in incorrect termination. However, without these additional sockets and components, upgradeability would be limited and impracticable.

Third, maintenance and serviceability would be difficult and very expensive. In order to offer different configuration options, such as multiple I/O bridges, a varying number of processors, multiple memory controllers, local I/O devices, etc., a computer system vendor would be required to build and stock multiple versions of the proposed PCB. This limits flexibility and increases cost. In addition, there is a high probability that a field service event for an electrical component failure will require replacement of the entire PCB. This would further necessitate that such expensive boards be inventoried by all field service organizations.

Therefore, a new bus architecture is desired for implementing a bus standard which allows identical functionality and performance and which complies with the respective bus standard, but which also provides superior flexibility, upgradeability and serviceability. Thus, a modular bus architecture is desired which provides the desired superior flexibility, upgradeability and serviceability.

As mentioned above, in the P6.0 bus standard, it is desirable for the P6 processors to be located at the ends of the bus for signal quality reasons. Thus, to implement a modular P6.0 bus architecture where the processors are on interchangeable modules, the module connectors must be located at the ends of the bus. However, this type of architecture creates difficulties for maintaining proper bus termination. In the case where no module is plugged into a connector at one end of the bus, termination must be provided on the PCB motherboard as close to the connector as possible so that no appreciable stub exists. In the case where a processor module is plugged into the connector at one end of the bus, the effective end of the bus changes to be located on the processor module. Thus, to maintain proper termination, the termination on the motherboard near the connector must be removed, and the bus must be terminated at the effective bus end on the processor module.

One solution for this problem is to provide a removable termination device on the motherboard near the connector that can be removed and placed on a processor module when the module is added to the system. Another possible solution is to plug a termination module into the connector when the connector is not being used for a processor module. When it is desired to add a processor module, the termination module is simply removed and a processor module containing termination is inserted into the connector.

Both aforementioned solutions have disadvantages when the system is being reconfigured. In the first solution, the person performing the reconfiguration must physically remove the termination from the motherboard and insert it on the processor module. Physically handling components in a system of sensitive electrical components increases the risk of a component being physically damaged or electrically damaged through electrostatic discharge (ESD). Also, many users who are unfamiliar with computer systems are daunted by the relatively complex task of relocating a termination device.

In the second aforementioned solution, the person performing the reconfiguration must physically remove the termination module from the connector and then insert the processor module into the connector. This solution has the same disadvantages mentioned above. Additionally, if a user forgets to install the termination module and no processor module is installed, the bus is not properly terminated and may not operate correctly. Furthermore, the termination module must be in a similar form factor as the processor module in order to plug into the same connector. This requirement increase the cost of the termination module, and when the processor module is installed, the termination module is not used and must be stored by the user.

Therefore, a new bus architecture is desired for implementing a bus standard which allows identical functionality and performance and which complies with the respective bus standard, but which also provides superior flexibility, upgradeability and serviceability. Additionally, it is desired for the new bus architecture to allow for modular components to be added and automatically maintain proper bus termination so that no additional user intervention is required to maintain proper bus termination. It is further desired that the bus termination be cost effective.

SUMMARY OF THE INVENTION

A computer system implementation according to the present invention comprises a computer bus with at least one connector for receiving an add-in module to allow modular configuration of the computer system. The system and method of the present invention automatically terminate the computer bus according to the presence of the module so that correct bus termination is always maintained. This automatic bus termination allows for a modular bus architecture without the need for additional manual intervention to reconfigure the bus termination. Therefore, the present invention is less confusing to the user and avoids the increased risk of component damage associated with manually reconfiguring bus termination. The present invention also provides automatic reconfiguration of bus termination without the added expense of a removable termination module.

In one embodiment of the invention, a computer bus is primarily located on a printed circuit board (PCB) motherboard. A connector for receiving a module is located at one end of the bus. A first bus termination device is provided on the motherboard near the connector at the end of the bus and is electrically coupled to the computer bus through a switch device. Each add-in module includes a second termination device located in the module.

When no module is inserted in the connector, the switch device is in an on state, and the first termination device is electrically coupled to the bus and provides correct termination at the bus end. When a module is inserted into the connector, the switch device is switched to an off state so that the first termination device is no longer electrically coupled to the bus. Rather, when a module is inserted, bus termination is supplied by the second termination device located on the module, and thus the effective end of the computer bus is on the module when the module is inserted.

In the preferred embodiment of the invention, the computer bus complies with the P6.0 bus standard. The bus is primarily located on a motherboard and terminated at one end on the motherboard. Various devices are preferably coupled to the bus on the motherboard, including at least one P6 microprocessor and at least one bus device, such as a memory controller or a bus bridge. A connector is coupled to the other end of the bus for receiving an add-in module to allow for modular configuration of the computer system. A termination device is electrically coupled to the bus through a switch device, and the termination device is located as close as possible to the connector.

The switch device receives a signal from the connector indicating whether a module is inserted in the connector, and the switch selectively electrically couples the termination device to the bus depending on whether a module is present in the connector. When a module is not present in the connector, the switch electrically couples the termination device on the motherboard to the bus. When a module is present in the connector, the switch device is disabled and the termination device on the motherboard is not electrically coupled to the bus. Instead the bus is terminated by a termination device on the module, since the effective end of the bus is now located on the module. Thus the invention automatically maintains proper bus termination when the module is inserted or removed.

Therefore, the present invention provides a system and method for automatically maintaining correct bus termination in a modular computer bus architecture. The present invention facilitates the advantages of a modular architecture without incurring the expense, risk for component damage, and user confusion of manual termination schemes. Therefore, the present invention provides a new bus structure for implementing any bus standard, including the Intel P6.0 bus standard, while also providing modularity and superior flexibility, upgradeability and serviceability. Furthermore, the desired functionality and performance of a P6.0 bus implemented according to the present invention is identical to the proposed implementation.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
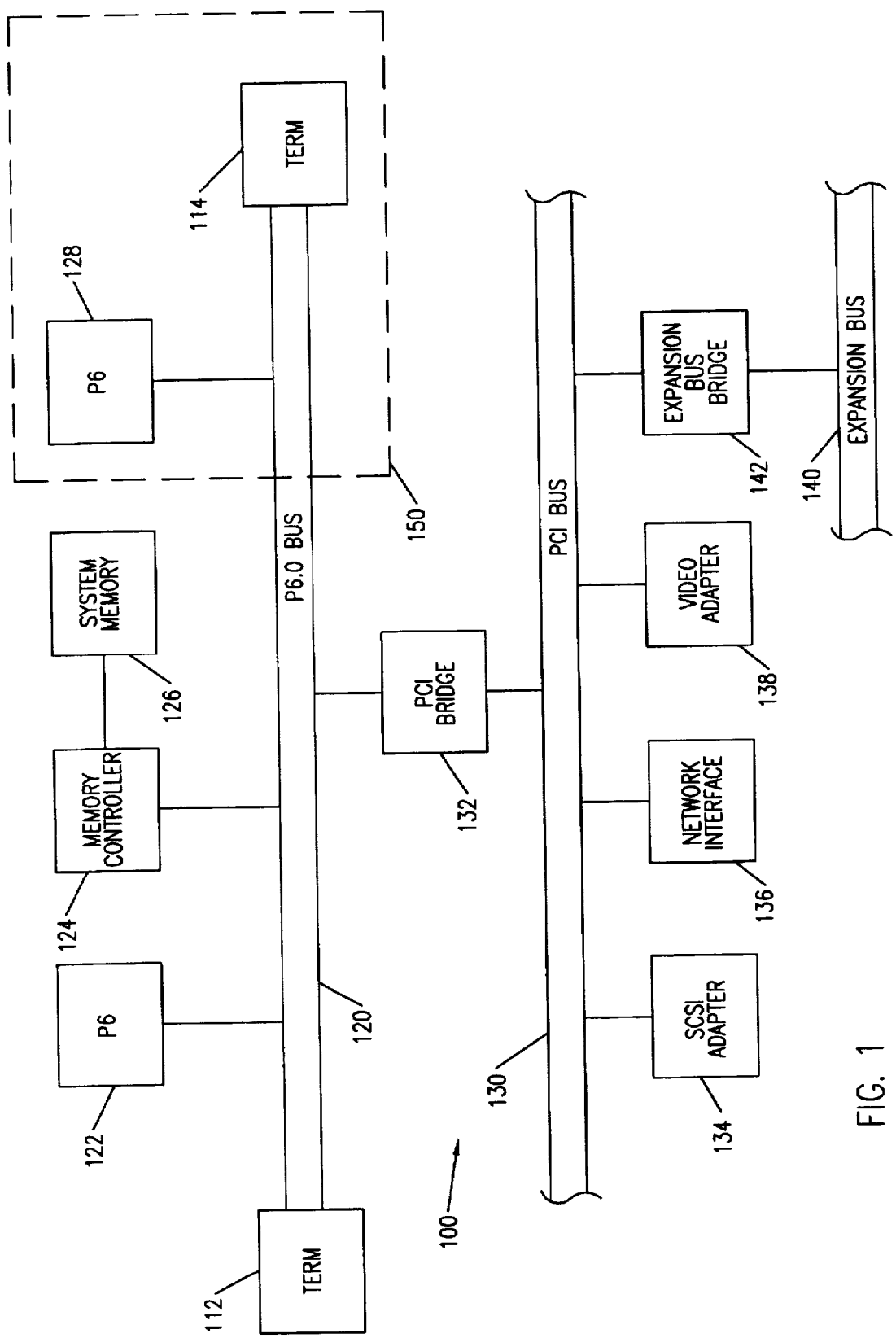
FIG. 1 is a simplified block diagram of a computer system including a P6.0 bus.

Referring now to FIG. 1, a simplified block diagram of a computer system 100 is shown according to the prior art. The computer system 100 is a multiprocessor system including two microprocessors 122, 128, coupled to the bus 120. The bus 120 is the P6.0 bus and the microprocessors 122, 128 are P6 microprocessors from Intel, where the P6 microprocessor or central processing unit (CPU) is the successor to Intel's P5 or "Pentium" microprocessor.

The P6.0 bus is designed to be a high performance personal computer bus including split transactions and operating at a high bandwidth, and preferably uses GTL+ (Gunning Transistor Logic) I/O buffer technology. The P6.0 bus standard requires termination devices 112, 114 located at each end of the P6.0 bus 120.

A memory controller 124 preferably conforming to the P6.0 bus standard is coupled to the processor bus 120. System memory 126 is coupled to the memory controller 124. The system memory 126 is preferably implemented using dynamic random access memories (DRAMs) or the like. One or more I/O devices conforming to the P6.0 standard are preferably coupled to the processor bus 120, including a peripheral system interconnect (PCI) bridge 132, for interfacing with a PCI bus 130. In this manner, one or more I/O devices are connected to the PCI Bus 130, such as a SCSI adapter 134, a network interface 136, a video adapter 138, and an expansion bus bridge 142 for coupling the PCI bus 138 to an expansion bus 140.

Although not shown, additional devices may be part of the computer system 100, such as interrupt control devices, real time clock (RTC) timers, a direct memory access (DMA) system, system read only memory (ROM), etc., and the expansion bus 140 is further coupled to other devices such as expansion memory, a modern, etc. The expansion bus 140 is preferably the ISA bus, the EISA bus or other similar type I/O bus. Other support logic and system components are not shown for purposes of simplicity.

The bus implementation shown in FIG. 1 requires that most or all of the P6.0 bus devices, including the P6 microprocessors 122, 128, the memory controller 124, the system memory 126, the PCI bridge 132, bus termination devices 112, 114 and the P6.0 bus 120 itself be mounted on a single, large PCB. Such a large PCB would be very large, costly, and have limited flexibility for upgrades and service. The present invention allows a module P6.0 bus implementation while also providing ease of use.

Figure 2:
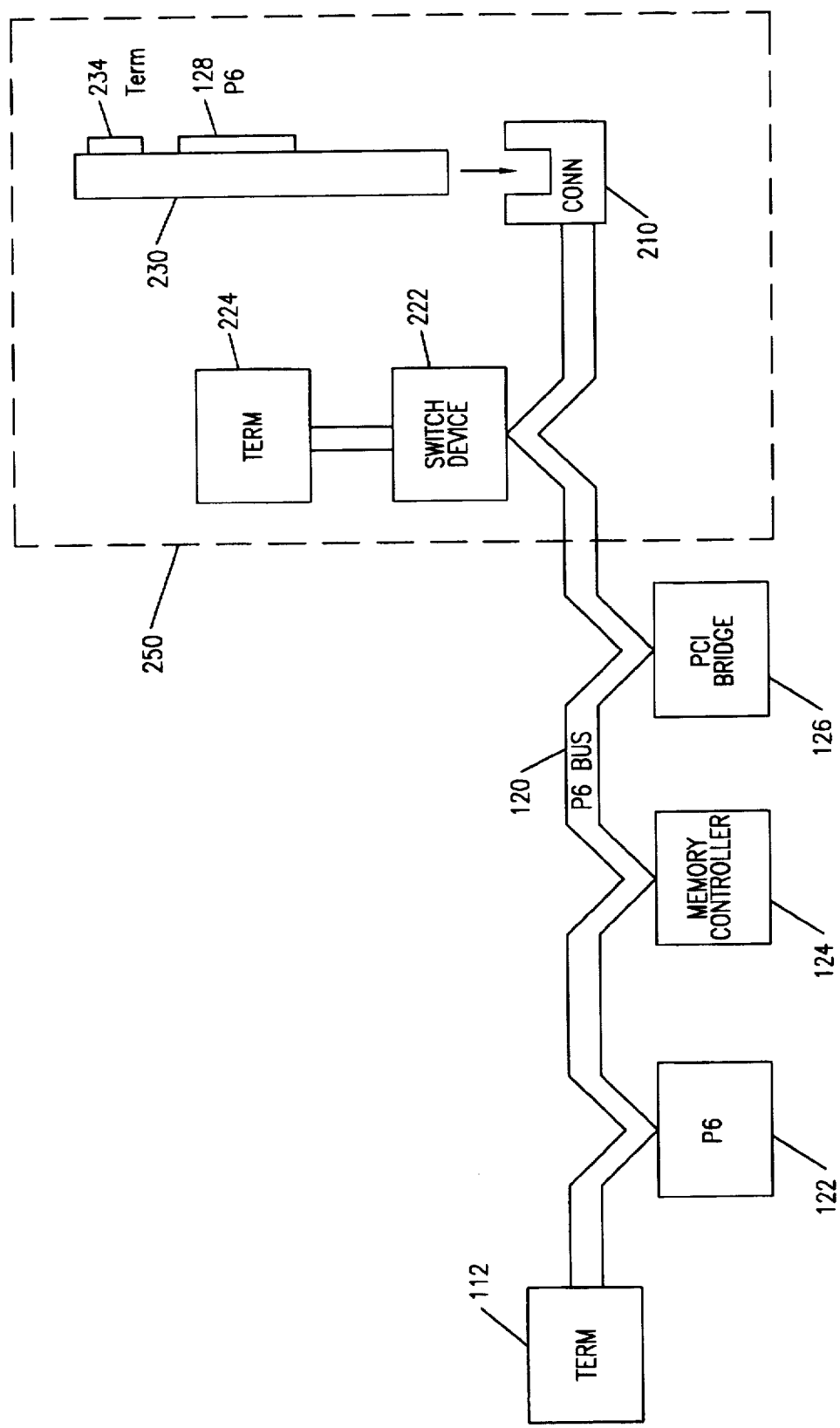
FIG. 2 illustrates an implementation of a modular bus architecture with an automatic bus termination system according to the present invention, which may be used in the computer system of FIG. 1.

Referring now to FIG. 2, a modular version of the computer system of FIG. 1 is shown according to the present invention. The computer system of FIG. 2 is similar to the computer system of FIG. 1. However, the computer system of FIG. 2 includes logic according to the present invention which automatically and selectively terminates the bus based on the presence or absence of modules coupled to the bus.

As shown in FIG. 2, the computer system includes a bus 120, preferably a P6.0 bus, for electrically coupling a plurality of devices, including one or more P6 processors. It is understood that the present invention is not limited to any particular microprocessor, CPU or corresponding bus standard. Alternate embodiments of the present invention use different microprocessors, such as the 80386, i486 or Pentium processors by Intel, the K5 processor from AMD, the M1 from Cyrix, the Power PC microprocessor, etc. Alternate embodiments also use different types of bus implementations as desired. In the preferred embodiment, the bus implementation for the present invention is the Intel P6.0 bus standard and the processors 122 and 128 are P6 processors from Intel Corporation.

As shown, P6 processor 122, memory controller 124, PCI bridge 126, and switch device 222 are connected to the P6.0 bus. The devices are shown coupled to the bus with angled lines to represent the P6.0 bus standard requirement that devices be connected on the bus in a daisy chain fashion with no stubs. A bus termination device 112 is present at one end of the P6.0 bus 120. Connector 210 is coupled to the other end of the bus 120 and is adapted for receiving an interchangeable modular add-in card 230, preferably a P6 processor card. As shown, the module 230 is adapted for insertion into the connector 210. The switch device 222 is shown coupled to the bus 120 near the connector 210. Termination device 224 is coupled to the switch device 222. The other computer system components such as the system memory 126 and PCI bus 130 are not shown in FIG. 2 since their presence on the diagram is not necessary for an understanding of the invention.

Thus, the computer system of FIG. 2 includes connector 210 for receiving modular P6 module 230 and also includes automatic termination logic according to the present invention. In FIG. 2, the P6 processor 128 and termination device 114 in the dashed box 150 of FIG. 1 have been replaced with the module 230, connector 210, switch device 222, and termination device 224 as shown in the dashed box 250 in FIG. 2. The module 230 comprises at least one P6 processor 128 and a termination device 234.

The devices in the dashed box 250 in FIG. 2 comprise an automatic computer bus termination system for a modular bus architecture according to the preferred embodiment of the present invention. This system allows a modular architecture so that the computer system configuration may easily be changed or serviced by simply replacing the module. In the preferred embodiment, the module 230 is a processor module. However, it is understood that the module 230 may be any computer bus device, such as an additional memory subsystem.

When the module 230 is inserted in the connector 210 at the end of the bus 120, the effective end of the bus 120 changes to be on the processor module 230. The termination device 234 on the processor module is used to terminate the P6.0 bus 120 when the module 230 is inserted in the connector 210, since the P6.0 bus standard requires the termination to be located at the end of the bus. Also, the termination device 224 is electrically decoupled from the P6.0 bus 120 when the module 230 is inserted in the connector 210. When the module 230 is not present in the connector 210, the termination device 224 on the motherboard is electrically coupled to the P6.0 bus to provide proper termination, and the termination device 234 on the module 230 is not present. The electrical coupling and uncoupling of the termination device 224 to the P6.0 bus 120 is performed by the switch device 222 responsive to the presence of a module in the connector 210.

Figure 3:
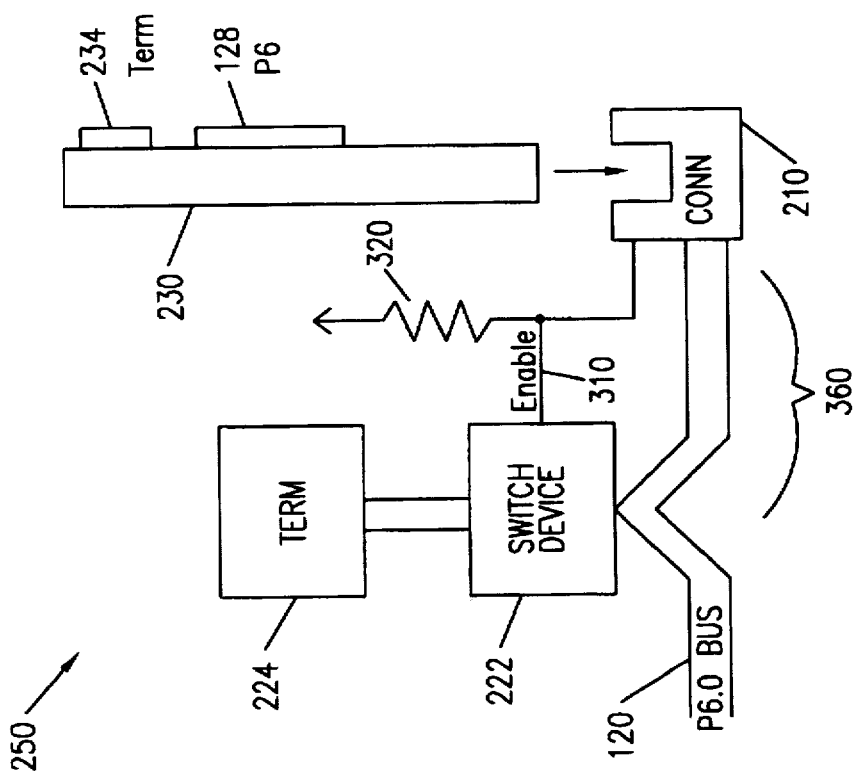
FIG. 3 is a more detailed diagram of the automatic termination system used in the bus implementation shown in FIG. 2.

Referring now to FIG. 3, a more detailed diagram is shown of the automatic computer bus termination system for a modular bus architecture according to the preferred embodiment of the present invention. The switch device 222 receives an enable signal 310 from the connector 210. When module 230 is not present in the connector 210, the enable signal 310 is held in an active state by the resistor 320 connected to the supply voltage from a voltage supply (not shown). When the enable switch is in the active state, the switch device 222 is in the on state and termination device 224 is electrically coupled to the P6.0 bus 120 through the switch device 222 to provide proper termination at the end of the P6.0 bus. Note that the traces comprising the P6.0 bus from the switch device 222 to the connector 210, represented by the bracket 360, are routed to be as short as possible so that this portion 360 of the P6.0 bus 120 does not form an appreciable stub from the switch device 222 to the connector 210.

In the preferred embodiment of the invention, the switch device 222 is an integrated circuit (IC) type switch. However, it is understood that any switch device responsive to an enable type signal may be used to practice the invention. Also, it is noted that other devices besides the resistor 320 may be used to hold the enable signal 310 in the active state when a module such as module 230 is not present in the connector 210.

When the module 230 is present in the connector 210, the enable signal 310 is driven to an inactive state, and the switch device 222 is in an off state so that the termination device 224 is not electrically coupled to the P6.0 bus. Instead, the bus 120 is terminated by termination device 234 on the module 230. Thus, when the module 230 is inserted in the connector 210, the termination device 234 on the module 230 provides the necessary bus termination.

When the module 230 is not present in the connector 210, the enable signal 310 is held in the active state, and the switch device 222 is in an on state so that the termination device 224 is electrically coupled to the P6.0 bus. Thus, the P6.0 bus 120 is terminated by the termination device 224 through the switch device 222 when the module 230 is not present in the connector 210. When the module 230 is present in the connector 210, the P6.0 bus is terminated by the termination device 234 on the module 230. Thus, proper bus termination is always maintained at the end of the bus 120 as required by the P6.0 bus standard.

In the preferred embodiment of the invention, the termination devices comprise resistors coupled to the P6.0 bus 120 on one end and to a termination supply voltage for the P6.0 bus 120 on the other end, according to the P6.0 bus standard. However, it is noted that the invention may be practiced for other buses and bus standards. Also, other termination devices besides resistors may be used.

Figure 4:
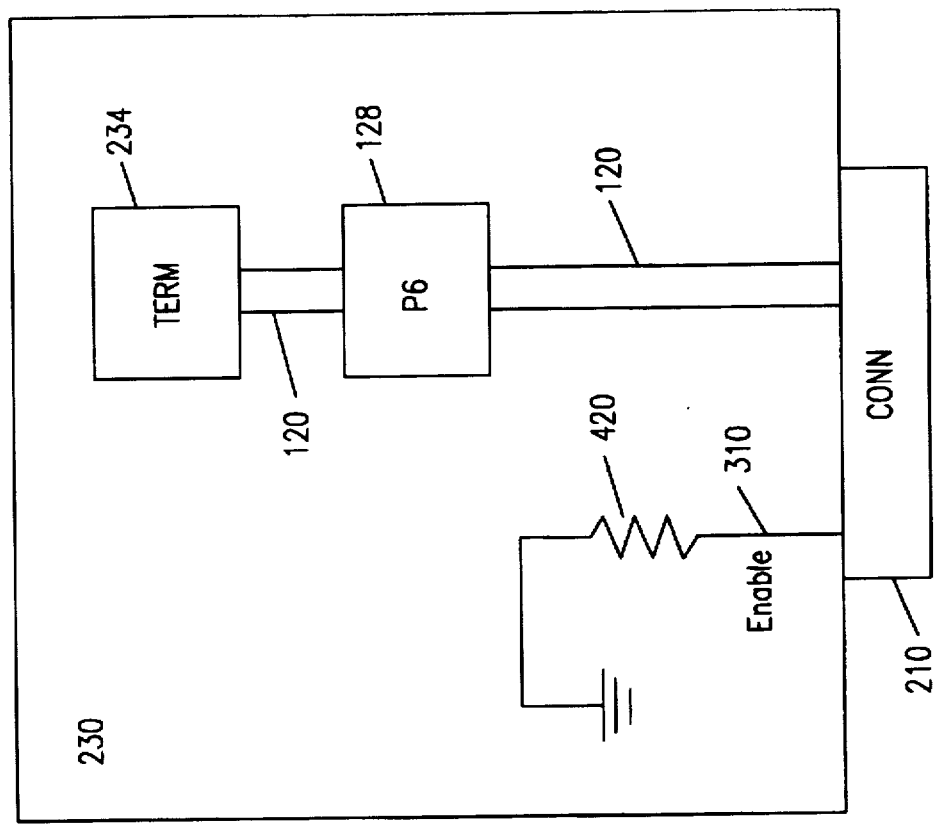
FIG. 4 is a more detailed diagram of a module according to the present invention used in the bus implementation shown in FIG. 2.

Referring now to FIG. 4, a more detailed diagram of the module 230 is illustrated. The module 230 is shown inserted in the connector 210. The P6.0 bus 120 is routed onto the module 230 by the connector 210. A P6 processor 128 and a termination device 234 are shown coupled to the P6.0 bus 120 on the module 230. The end of the P6.0 bus 120 is terminated on the module 230 by the termination device 234. The enable signal 310 is routed onto the module 230 through the connector 210 and is connected to one end of a resistor 420. The other end of the resistor 420 is connected to ground. The resistance value of the resistor 420 is smaller than that of the resistor 320 in FIG. 3 so that the ratio of the resistor values results in the enable signal 310 being driven to the inactive state when the module 230 is inserted in the connector 210 as shown in FIG. 4.

It is noted that other devices beside the resistor 420 may be used to drive the enable signal 310 to the inactive state when a module is inserted in the connector 210. For example, an active type device may be used, or the enable signal may be connected directly to the ground plane, or low voltage plane on the module.

Figure 5:
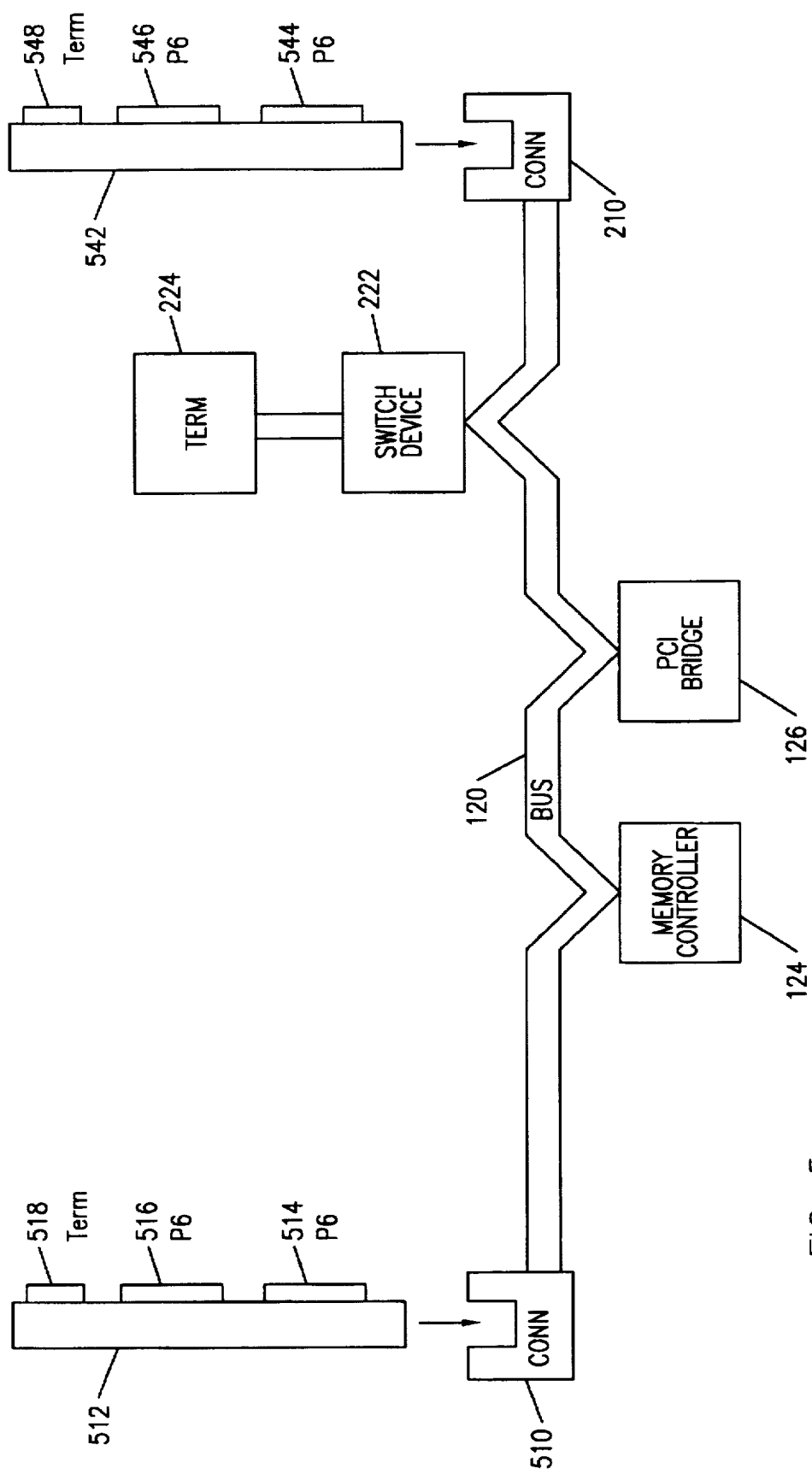
FIG. 5 illustrates another embodiment of a modular bus architecture with automatic termination according to the present invention.

Referring now to FIG. 5, an alternate embodiment is shown of a modular computer system according to the present invention. The embodiment of FIG. 5 is similar to the embodiment of FIG. 2. The system includes a bus 120, preferably a P6.0 bus. Memory controller 124 and PCI bridge 126 are coupled to the computer bus 120.

Connectors 510, 210 are at each end of the bus for receiving modules 512 and 542. A switch device 222 is coupled to the bus and is preferably located at one end of the bus 120 as close as possible to the connector 210. Termination device 224 is connected to the switch 222. The system shown in FIG. 5 includes the processor modules 512 and 542. Each processor module 512, 542 comprises two processors 514, 516, 544, 546 respectively and a bus termination device 518, 548, respectively. The processor modules 512, 542 are interchangeable so that they may be plugged into either connector 510, 210. Other computer system components not necessary for the understanding of this embodiment of the invention are not shown, such as system memory and the PCI bus.

The switch device 222 selectively electrically couples the termination device 224 to the end of the bus depending on whether the switch device 222 is in an on or an off state. When the module 542 is not present in the connector 210, the switch device is in the on state and the termination device is electrically coupled to the bus 120. When the module 542 is present in the connector 210, the switch 222 is in the off state and the termination device 224 is not electrically coupled to the bus 120. Instead the end of the bus 120 is terminated by a termination device 548 on the module 542. Thus, computer bus 120 is correctly terminated automatically when the module 542 is inserted into or removed from the connector 210.

When a processor module is inserted in one of the connectors 510, 210, the respective end of the computer bus is terminated on the processor module by the respective termination device 518, 548. A switch device 222 and termination device 224 are associated with the computer bus 120 end at one connector 210 so that when no module is present in that connector 210, the computer bus 120 is terminated by the termination device 224 through the switch device 222. However, in the embodiment of the present invention shown in FIG. 5, no termination device and switch device are associated with the connector 510 at the other computer bus 120 end. Thus a module, such as the processor module 512, is always required to be present in the connector 510 to provide proper termination at the end with no switch device and termination device.

An alternate embodiment of the invention (not shown) comprises the aforedescribed automatic termination system at both modular ends of a computer system bus so that no modules, one module, or both modules may be present and the computer bus always automatically receives the proper bus termination. Other embodiments of the invention exist for buses requiring termination at only one end, in places other than the ends, or other configurations.

Thus, the present invention provides a bus structure for implementing a bus standard, such as the P6.0 bus standard by Intel, while providing modularity and automatically maintaining proper bus termination. The present invention achieves superior flexibility, upgradeability and serviceability benefits of a modular bus system without incurring the increased damage risk, cost, and user confusion disadvantages of prior termination techniques.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system which automatically and selectively terminates a computer bus as add-in modules are added to and removed from the bus, the system comprising:

a computer bus having a first end and a second end, wherein said computer bus requires termination located at said first end;

a first termination device, located near said first end of said computer bus, for terminating said first end of said computer bus;

a connector located near said first end of said computer bus and coupled to said first end of said computer bus, wherein said connector is adapted to receive interchangeable modules;

a first interchangeable module adapted for insertion into said connector, wherein said first interchangeable module comprises a second termination device for terminating said first end of said computer bus; and a switch coupled to said first end of said computer bus and to said first termination device, wherein said switch is responsive to the presence of said first interchangeable module in said connector to electrically couple said first termination device to said first end of said computer bus only when said first interchangeable module is not present in said connector, wherein said first termination device terminates said first end of said computer bus when said first interchangeable module is not present in said connector; and wherein said second termination device terminates said first end of said computer bus when said first interchangeable module is present in said connector.

2. The system of claim 1, wherein said first interchangeable module generates an enable signal; and wherein said switch receives said enable signal, and wherein said switch operates to electrically couple said first termination device to said first end of said computer bus when said enable signal is in a first state indicating absence of said interchangeable module and said switch does not electrically couple said first termination device to said first end of said computer bus when said enable signal is in a second state indicating presence of said interchangeable module.

3. The system of claim 1, wherein said first interchangeable module further comprises at least one microprocessor.

4. The system of claim 3, wherein said at least one microprocessor is a P6 central processing unit.

5. The system of claim 1, wherein said computer bus requires termination at said second end, the system further comprising:

a third termination device located near said second end of said computer bus and electrically coupled to said second end of said computer bus, wherein said third termination device terminates said second end of said computer bus.

6. The system of claim 5, further comprising:

a second connector located near said second end of said bus and coupled to said second end of said bus, wherein said second connector is adapted to receive interchangeable modules; and a second interchangeable module adapted for insertion into said second connector, wherein said second termination device is located on said second interchangeable module.

7. The system of claim 1, wherein said computer bus operates according to the P6.0 bus standard.

8. The system of claim 1, wherein said computer bus supports Gunning Transistor Logic (GTL) buffer technology.

9. The system of claim 1, wherein said first and second termination devices comprise resistors.

10. The system of claim 1, wherein said switch comprises an integrated circuit (IC) switch.

11. A computer system, comprising a motherboard;

a computer bus having a first end and a second end, wherein said computer bus is located primarily on said motherboard, and wherein said computer bus requires termination located at said first end and termination located at said second end for proper operation;

at least one bus device coupled to said computer bus;

a first termination device for terminating said first end of said computer bus, wherein said first termination device is located on said motherboard near said first end of said computer bus;

a second termination device which terminates said second end of said computer bus, wherein said second termination device is located near said second end of said computer bus and is electrically coupled to said second end of said computer bus;

a first connector adapted to receive interchangeable modules, wherein said first connector is located on said motherboard near said first end of said computer bus and coupled to said first end of said computer bus;

a first interchangeable module adapted for insertion into said first connector, wherein said first interchangeable module comprises a third termination device for terminating said first end of said computer bus;

wherein said first end of said computer bus is effectively located on said first interchangeable module when said first interchangeable module is present in said first connector, and wherein said first end of said computer bus is effectively located on said motherboard when said first interchangeable module is not present in said first connector; and a switch, located on said motherboard, coupled to said first termination device and to said first end of said computer bus, wherein said switch is responsive to the presence of said first interchangeable module in said first connector to electrically couple said first termination device to said first end of said computer bus only when said first interchangeable module is not present in said first connector, wherein said first termination device terminates said first end of said computer bus when said first interchangeable module is not present in said first connector; and wherein said third termination device terminates said first end of said computer bus when said first interchangeable module is present in said first connector.

12. The computer system of claim 11, wherein said switch receives an enable signal, and wherein said switch operates to electrically couple said first termination device to said first end of said computer bus when said enable signal is in an active state and said switch does not electrically couple said first termination device to said first end of said computer bus when said enable signal is in an inactive state.

13. The computer system of claim 12, wherein said enable signal is held in said active state when said first interchangeable module is not present in said first connector, and wherein said enable signal is held in said inactive state when said first interchangeable module is present in said first connector.

14. The computer system of claim 11, wherein said first interchangeable module further comprises at least one microprocessor.

15. The computer system of claim 14, wherein said at least one microprocessor is a P6 central processing unit.

16. The computer system of claim 11, further comprising:

a second connector adapted to receive interchangeable modules, wherein said second connector is located on said motherboard near said second end of said computer bus and is coupled to said second end of said computer bus; and a second interchangeable module inserted in said second connector, wherein said second end of said computer bus is located on said second interchangeable module, and wherein said second termination device is located on said second interchangeable module.

17. The computer system of claim 16, wherein said second interchangeable module comprises at least one microprocessor.

18. The computer system of claim 17, wherein said at least one microprocessor is a P6 central processing unit.

19. The computer system of claim 11, further comprising at least one microprocessor located on said motherboard and coupled to said computer bus, and wherein said second termination device is located on said motherboard.

20. The computer system of claim 19, wherein said at least one microprocessor is a P6 central processing unit.

21. The computer system of claim 11, wherein said computer bus operates according to the P6.0 bus standard.

22. The computer system of claim 11, wherein said computer bus supports Gunning Transistor Logic (GTL) buffer technology.

23. The computer system of claim 11, wherein said first, second, and third termination devices comprise resistors.

24. The computer system of claim 11, wherein said switch comprises an integrated circuit (IC) switch.

25. The computer system of claim 11, wherein said at least one bus device comprises a memory controller and a bus bridge device.

26. A system for automatically and selectively terminating a computer bus having an end and requiring termination located at said end, the system comprising:

a switch coupled to said computer bus;

a first termination device, coupled to said switch, for terminating said end of said computer bus, wherein said first termination device is located at said end of said computer bus;

a connector adapted to receive a module, wherein said connector is located near said end of said computer bus and coupled to said end of said computer bus, and wherein said module comprises a second termination device for terminating said end of said computer bus; and wherein said switch is responsive to the presence of said module in said connector to couple said first termination device to said end of said computer bus only when said module is not present in said connector, wherein said first termination device terminates said end of said computer bus when said module is not present in said connector; and wherein said second termination device terminates said end of said computer bus when said module is present in said connector.

27. A method for automatically terminating a computer bus, said computer bus having an end which requires termination, wherein a connector is coupled to said computer bus near said computer bus end, wherein the connector is adapted to receive a module, the method comprising:

coupling a first termination device to said computer bus end when said module is not present in said connector, wherein said first termination device terminates said end of said computer bus;

inserting said module into said connector;

automatically coupling a second termination device, located on said module, to said computer bus end in response to said module being inserted in said connector; and automatically decoupling said first termination device from said computer bus end in response to said module being inserted in said connector;

wherein said second termination device terminates said end of said computer bus in response to said module being inserted in said connector.

28. The method of claim 27, further comprising:

removing said module from said connector; and automatically coupling said first termination device to said computer bus end in response to said module being removed from said connector;

wherein said first termination device terminates said end of said computer bus in response to said module being removed from said connector.

* * * * *